Jan. 4, 1966        W. A. WEBB ET AL        3,226,928
HONEYCOMB ROCKET PROPELLANT GRAIN

Filed Jan. 24, 1962                        5 Sheets-Sheet 1

INVENTORS
Wells A. Webb
BY Wendell T. Jackson

Townsend and Townsend
attorneys

Jan. 4, 1966 W. A. WEBB ET AL 3,226,928
HONEYCOMB ROCKET PROPELLANT GRAIN
Filed Jan. 24, 1962 5 Sheets-Sheet 2

INVENTORS
Wells A. Webb
BY Wendell T. Jackson

Townsend and Townsend
attorneys

Jan. 4, 1966 W. A. WEBB ET AL 3,226,928
HONEYCOMB ROCKET PROPELLANT GRAIN
Filed Jan. 24, 1962 5 Sheets-Sheet 3
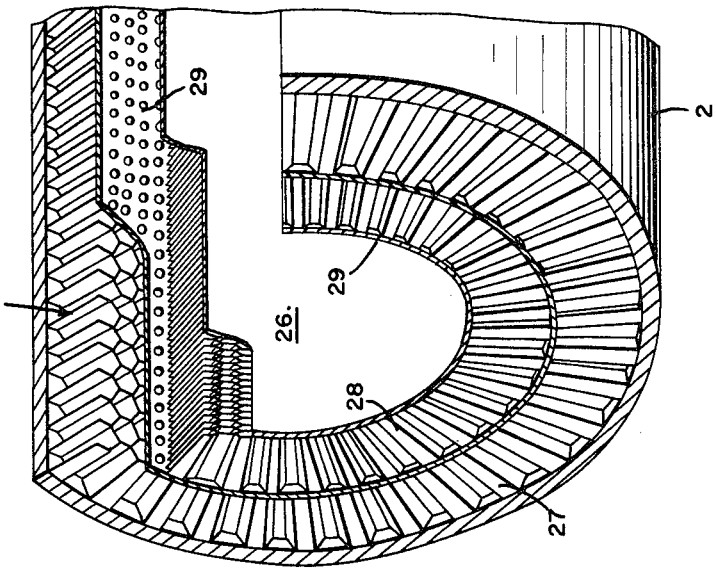
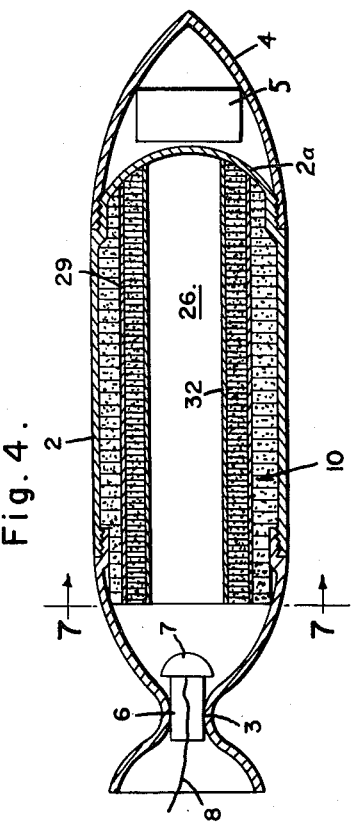
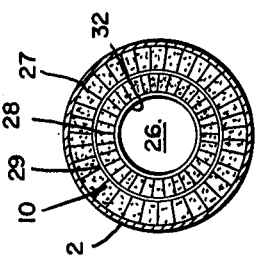
INVENTORS
Wells A. Webb
BY Wendell T. Jackson
Townsend and Townsend
attorneys

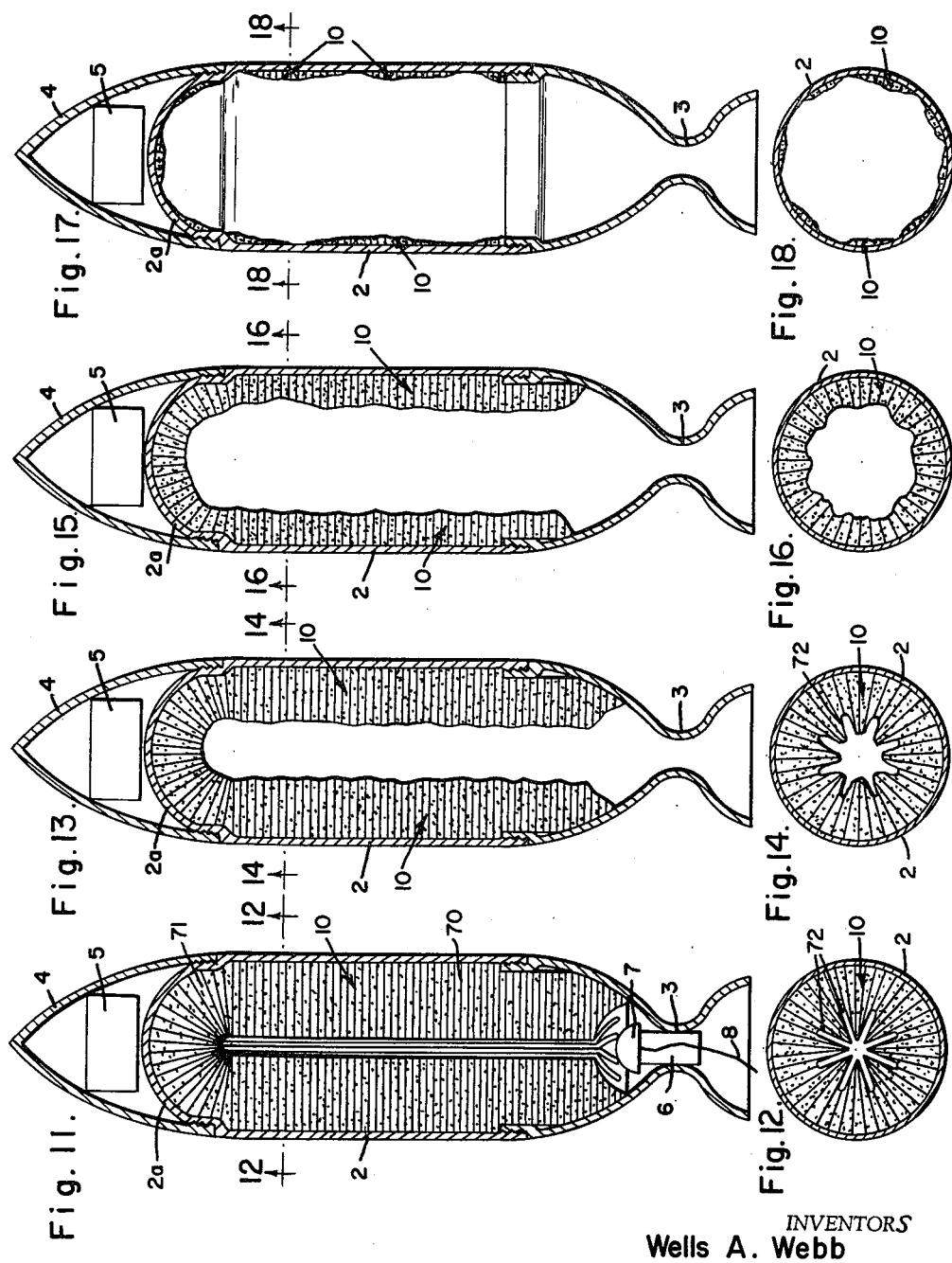

Jan. 4, 1966　　　W. A. WEBB ET AL　　　3,226,928
HONEYCOMB ROCKET PROPELLANT GRAIN
Filed Jan. 24, 1962　　　　　　　　　　　　5 Sheets-Sheet 5

*INVENTORS*
Wells A. Webb
BY Wendell T. Jackson

*Townsend and Townsend*
*attorneys*

United States Patent Office 3,226,928
Patented Jan. 4, 1966

3,226,928
HONEYCOMB ROCKET PROPELLANT GRAIN
Wells A. Webb, Berkeley, and Wendell T. Jackson, Pleasant Hill, Calif., assignors to Hexcel Products Inc., Berkeley, Calif., a corporation of California
Filed Jan. 24, 1962, Ser. No. 183,315
14 Claims. (Cl. 60—35.6)

This application is a continuation in part of our copending application, Serial No. 728,432, filed April 14, 1958, now abandoned.

The present invention relates to the construction of rocket engines, and more particularly relates to structurally reinforced solid rocket grains and to a method of making rocket engines having structural properties.

In the present state of the art, the solid rocket has a cylindrical rocket case defining a hemispherical forward end and a constricted exhaust nozzle at the after end through which the combustion gases are discharged to generate the reaction which propels the rocket. Generally speaking, solid propellants or grains for rockets appear to offer a number of advantages over liquid fuel propellants of equivalent power. Liquid fuel engines require fuel pumps, plumbing, elaborate controls, coolant systems, and other power plant accessories normally not required with solid grain systems. Other factors being equal, elimination of power plant accessories, above mentioned, enhances the reliability, simplicity, and economy of any given rocket. Furthermore, it has been estimated that to double any given "payload" (i.e., components of inert weight not contributing directly to propulsion) in a rocket, the fuel load must be increased eight times. Consequently, it is of great significance to lighten as much deadweight as possible through elimination of powerplant accessories necessary or useful in conjunction with liquid fuels.

A further advantage of most solid propellants over their liquid fuel counterparts resides in the former's availability for almost immediate use, whereas, most liquid fuel powered rockets must be charged with liquid fuel just prior to firing.

Additionally, sloshing of liquid in rocket fuel tanks can cause unwanted vibration of the rocket in flight, or lead to uneven flow of the fuel and consequent fluctuation or even premature extinguishment of burning.

In spite of the significant advantages possible to obtain in using solid over liquid propellants of comparable power, there exists today a number of serious problems connected with the use of most solid propellants that greatly restrict and limit the use of solid propellants in many applications, and particularly in the relative larger size rockets. For example, and again by way of general observation, conventional solid propellants usually consist of cast, molded, or extruded charges comprising a matrix of fuel such as synthetic rubber or plastic polymers, for example, polyethylene, polyurethane, or polysulfide, and which said fuel matrices are loaded with and bind together in an agglomerated mass dispersed granules of particles of oxidant, such as ammonium perchlorate crystals, plus catalyst, and perhaps also quantities of powdered aluminum or other type of discrete fuel particles. It is a frequently encountered problem with solid propellant charges of the above type that in storage they may tend to "slump" (i.e., deform under their own weight) or after ignition the high pressures, heat and shock waves, developed in the combustion chamber can cause premature explosion or fracturing of the unburned charge. In this connection conventional solid propellant charges of the character above mentioned have insufficient structural strength and comparatively weak cohesive strength. Lack of cohesive strength is attributable in large measure to the high loading of the fuel matrix with granular particles of oxidant, catalyst and powdered fuel. For example, the stoichiometric proportion of polyethylene fuel to ammonium perchlorate oxidant is approximately 1:9. The creation of fissures or fractures in the material or the slumping or caving in of the fuel mass, even without explosion, will cause nonuniformity in the burning rate of the fuel which will cause fluctuations in the pressures or specific impulse being developed. Any one of these events result in highly unsatisfactory and unreliable conditions which in many instances are so serious that rocket designers are constrained to utilize liquid fuel systems in lieu of the solid propellant engine type.

Further by way of generality, in using conventional solid propellants of the foregoing mentioned type, it is usual to encase the charge within a metal structural casing to the interior walls of which the charge is bonded.

Because of the comparatively insignificant structural properties of the heterogeneous molded or extruded grain itself, the engine casing must be designed to provide adequate structural rigidity and to withstand the maximum bursting pressures developed. Normally, in center-burning rockets, (i.e., rockets in which combustion progresses from the center radially outwardly through the fuel mass toward the rocket casing walls) the maximum pressure is developed in the combustion chamber during the early stages of ignition and burning and during rocket take-off and initial flight. Consequently, engine casings using conventional solid propellants have to be designed and built of sufficiently heavy and rugged material to withstand the initial high pressures of take-off. However, this extra heavy construction may be viewed as nonfunctional dead weight during the majority of the rocket flight and including terminal stages thereof when the pressures may drop to well below the maximum bursting pressure of the casing developed during initial stages of burning at take-off.

A principal object of the present invention is to provide a solid rocket propellant which provides the inherent advantages attendant with the use of solid over more conventional liquid fuel systems, as above mentioned, and which overcomes or greatly minimizes the above stated disadvantages frequently encountered with the use of more conventionally constructed type solid rocket fuel.

In brief, the present invention proceeds from the concept of providing a solid or semi-solid amorphous propellant which is structurally reinforced by a combustible, stabilizing or reinforceing metal honeycomb fuel component which serves the multi-fold purposes of (1) structurally reinforcing the grain; (2) macro-encapsulating the amorphous mass of propellant into increments of relatively small cross-section; (3) contributing a high heat energy fuel component to the grain; (4) increasing the burning rate of the propellant reinforced by the honeycomb; (5) providing better pressure coefficient for the grain; and (6) establishing a more uniform burning rate for the grain within the extreme climatic temperature variations within the approximate range of —70° F. to 150° F.

Another object of the invention is to teach the uses of various types of combustible, metal honeycomb fuel components in rocket grains. In some embodiments to be described, the honeycomb will be shown as being incorporated in an end-burning type rocket; whereas, in other applications, the honeycomb may be oriented to provide types of unlimited or center-burning grains.

In amplification of the foregoing, the use of structural metal honeycomb as a component of the rocket grain will stabilize and reinforce the latter so as to greatly minimize the danger of premature explosion, fracturing or slumping of the unburned charge. Further, and depending on the type of charge and on the way in which the honeycomb cells are oriented with reference to the rocket casing, it is possible to design rocket engines taking advantage of the ability of honeycomb in the grain to contribute to the overall strength of the rocket casing. This feature of the present invention provides the possibility of constructing rocket grains so that the maximum amount of bursting pressure developed at the time of ignition and initial burning is resisted and withstood by the combined strength of the structural grain and the rocket case—it being kept in mind that during ignition and initial burning, a comparatively small amount of the structural charge will be consumed. The design of such a rocket may take into account the fact that as rocket flight progresses, the pressures will decline below maximum bursting pressure and accordingly, the rocket case itself need be only strong enough to withstand the pressures developed toward the burn-out stages when the majority of the structural fuel has been consumed.

The structural nature of the grain also provides a greater stiffness or rigidity to the rocket to minimize or prevent flexure thereof either in the course of handling or readying the rocket for flight, or due to vibration or other forces developed in flight. Moreover, because the honeycomb structurally reinforces and encapsulates the propellant, it is not necessary to rely solely upon the cohesive strength of a more conventional non-structural solid propellant fuel of the type alluded to above. To the contrary it is feasible to utilize high energy propellants in the form of gelatinous compounds which have substantially insignificant cohesive strength or other strength properties which render them completely unsuitable for use in more conventional solid rocket grain types of construction.

Another object and advantage of the present invention is that it is possible to utilize the relatively high ratings of heat conductivity of certain metal honeycombs, such as, aluminum honeycomb, in conjunction with non-metallic or organic fuel substances having a much lower heat conductive rating. In this connection, the rate of burning of a rocket grain is regulated and can proceed no faster than the rate of heat conduction from the burning surface into the interior of the grain. Stated otherwise, the grain can burn no faster than the heat wave can melt and vaporize the surface. By reinforcing organic fuel compositions (such as polyurethane or polyethylene fuel mixed with ammonium perchlorate oxidizer) with aluminum honeycomb oriented in the direction of burning, the metal honeycomb will conduct heat into the interior of the fuel body at a more rapid rate than heat can be transferred by conduction through the fuel body itself. By way of example, in employing relatively thin wall gauge (i.e., 0.5–2.5 mil gauge) aluminum honeycomb structural fuel component filled with conventional solid propellant agents (such as polyurethane and ammonium perchlorate fuel-oxidizer agents) the burning rate of the grain in the direction of the cell axes may be increased by a ratio of about three times the burning rate of the same fuel-oxidizer composition without the presence of the honeycomb structure. About a two-fold increase in burning rate occurs and has been measured when the burning of the grain is in a direction crosswise to the honeycomb cell axes.

It is also possible to obtain a better or more desirable pressure coefficient with a metal honeycomb reinforced grain as compared to a non-honeycomb grain made from the same propellant materials. More specifically, by plotting pressure-burning rate curves of both metal honeycomb reinforced and non-honeycomb reinforced propellants (where the burning rate curve is the ordinate and the pressure curve is the abscissa) it was demonstrated that a lesser angle of slope in the pressure curve was obtained in connection with the plotting of the reinforced grains compared to the non-reinforced grains. Generally speaking, the more nearly the pressure curve approaches horizontal the better the burning characteristics of the grain.

As indicated above, another extremely important advantage obtained in using metal honeycomb grain structures resides in the fact that the metal honeycomb inherently provides a rocket grain that has a substantially uniform burning rate regardless of the body temperature of the grain at the time of ignition. More specifically, in the case of more conventional grains composed of organic fuel substances (with or without metallic powders interspersed therein) the burning rate of such grains will vary materially in relation to the body temperature of the grain at the time of ignition. Hence, unless conventional grains are kept under storage at relatively constant temperatures (which in the case of larger size operational rockets is not feasible), the burning rate, and therefore the performance of the rocket in flight, will vary depending upon whether the grain is relatively cool or warm at the time of ignition. Thus, a conventional solid grain rocket stored and fired in the cooler climatic regions of the world will characteristically exhibit a slower burning rate and more sluggish performance than the same type of rockets which have been stored and fired in the hotter regions.

It has been demonstrated by others that the burning rate of a rocket in large measure will be governed by the rate that the slowest step of burning occurs. In view of the fact that the rate of heat conductivity of high heat conductive metals, such as aluminum, does not vary significantly (within a 5% variation) within the range of extreme climatic temperatures encountered throughout the world (e.g., $-70°$ F. at cooler regions to $150°$ F. at the hotter regions) the burning rate of an organic fuel-oxidant grain reinforced by a high heat conductive metal honeycomb fuel component will remain far more constant than a non-metallic honeycomb grain regardless of the body temperature of the rocket at the time it is fired as will probably be determined by the ambient temperature in which it has been stored.

It is also possible to take advantage of the fact that the cellular nature honeycomb presents a large surface area, which if fabricated as a propellant, can be used to provide greatly enlarged burning areas from which an entire grain, or only an igniting surface and initial burning area may be fabricated.

Other numerous objects and advantages of the present invention will become apparent upon reading the following specification and referring to the accompanying drawings in which similar characters of reference represent corresponding parts in each of the several views.

FIGS. 4 and 5 illustrate longitudinal and transverse sectional views respectively of a center burning grain including concentric annuli of honeycomb and with the honeycomb cell axes disposed perpendicular to the longitudinal axis of the rocket casing.

FIG. 6 is an enlarged fragmentary perspective view partially in section of the grain shown in FIGS. 4 and 5.

FIGS. 7–8 and 9–10, respectively, illustrate further modified types of grains.

FIGS. 11–18 illustrate a rocket incorporating a honeycomb reinforced grain in various stages of burning.

Figure 19:
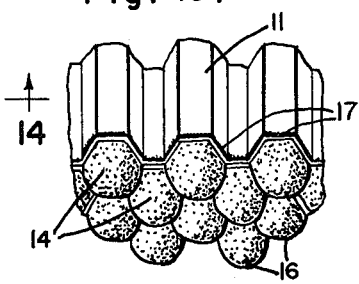

FIG. 19 is a fragmentary perspective view of a heat conductive metal honeycomb reinforced grain shown partially burned away.

Figure 20:
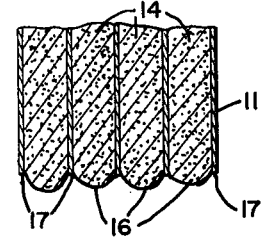

FIG. 20 is a sectional view of the structure shown in FIG. 19.

Figure 21:

FIG. 21 is a plan view of a modified form of honeycomb structure.

Figure 22:
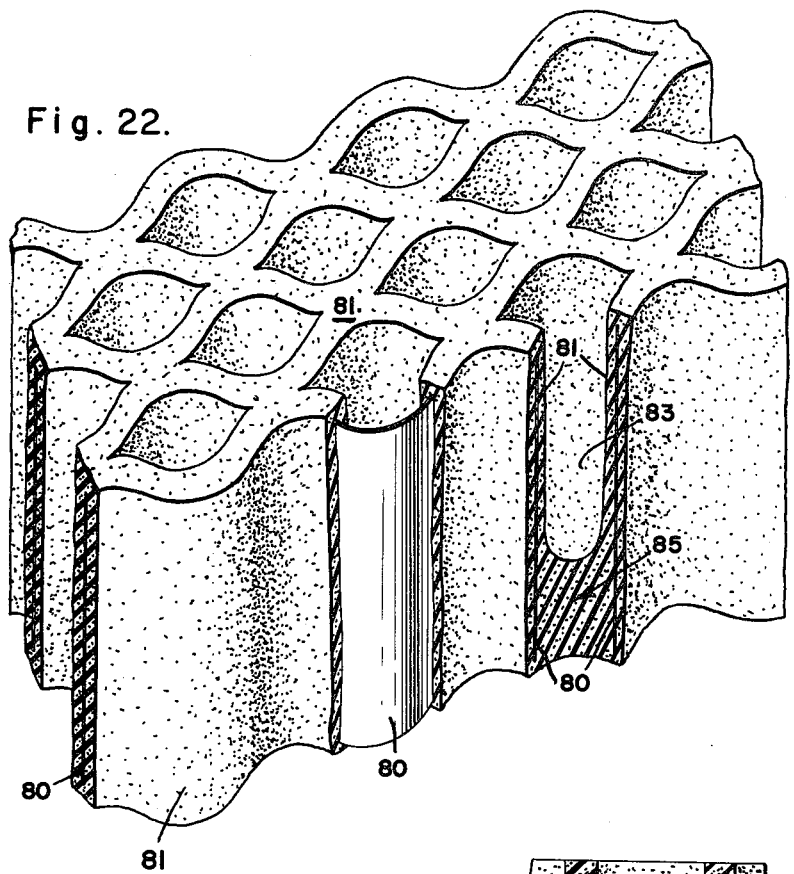
Figure 23:
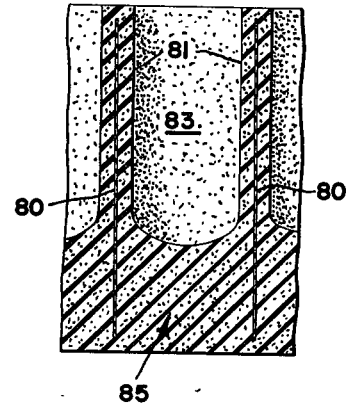

FIGS. 22 and 23 indicate a honeycomb type grain fabricated to provide an initially large burning surface area of fuel-oxidant mixture.

Figure 24:
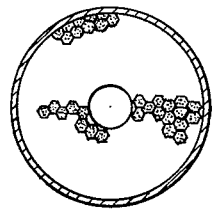

FIG. 24 is a sectional view of a rocket grain with the honeycomb cells (shown fragmentarily) oriented to provide primary burning of the grain crosswise to the cell axes.

In the various embodiments of the invention to be described, metal foil or sheet is fabricated into the form of structural honeycomb. The cell spaces of the honeycomb are solidly packed and filled with solid propellant compounds. As will appear, the metal honeycomb serves to structurally reinforce the grain while also acting as a fuel component thereof. Moreover, the use of high heat conductive metal honeycomb in the grain, when oriented in a particular manner in reference to the combustion chamber, increases the burning rate of the grain, stabilizes the burning of the grain in its primary burning direction, and provides a more uniform burning rate for the grain independent of body temperature variations of the grain.

Figure 1:
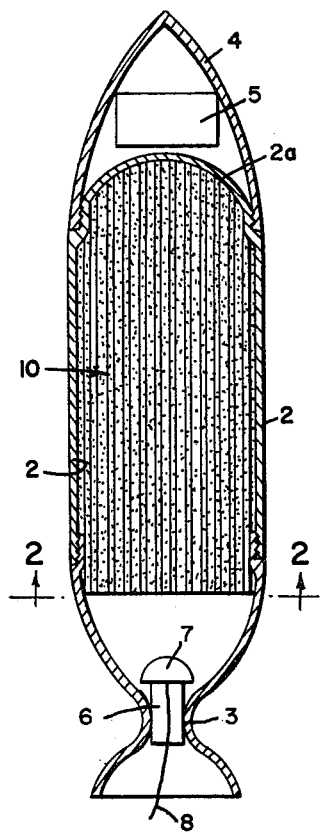
FIG. 1 is a longitudinal sectional view, shown partially schematically, of a rocket containing an end burning grain incorporating honeycomb material with the axis of the honeycomb cells being oriented in a direction parallel to the lengthwise axis of the rocket.
Figure 2:
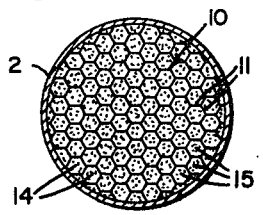
FIG. 2 is a transverse sectional view taken substantially on line 2—2 of FIG. 1.
Figure 3:
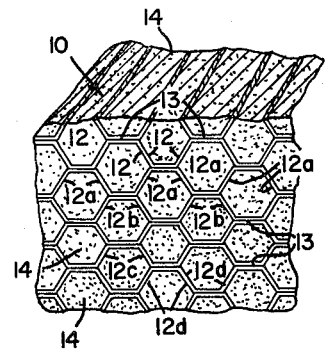
FIG. 3 is an enlarged fragmentary isometric view of the honeycomb reinforced grain of FIG. 1.

FIGS. 1–3 in the drawings illustrate, in part schematically, one embodiment of the invention. In this connection, FIG. 1 shows a rocket casing which is of substantially conventional design and configuration, and which defines an interior combustion chamber 2 including a hemispherical head plate 2a, a constricted exhaust nozzle 3, and a nose section 4 which may house the warhead, instrumentation, or other cargo 5 which the rocket is designed to carry. A conventional squib including a plug closure 6, an igniting powder charge 7, and an electric ignition cable 8 is also shown schematically positioned with the exhaust nozzle 3 in pre-ignition location.

The rocket components hereinabove designated by the reference characters 1–8, inclusive, for purposes of brevity and clarity, are repeated throughout the drawings, and the same per se do not constitute a part of the present invention.

The rocket grain or charge indicated generally at 10 is, in FIGS. 1–3, shown as comprising an end-burning type. More specifically, the charge is shown as comprising a section of expanded metal honeycomb material 11 substantially filling the combustion chamber 2 and oriented with the axes of the cell openings disposed parallel to the lengthwise axis of the rocket casing. The honeycomb cells are solidly packed with an amorphous mass of propellant agents 14 consisting of oxidizer and fuel including oxidizer to react and burn with the metal.

The structural honeycomb 11 is shown as being of conventional hexagonal configuration, although, the cell pattern and method of fabrication of such material may vary according to various chemical and physical specifications that the honeycomb is required to meet as a component in any particular rocket grain. FIG. 21 shows schematically a honeycomb of more or less conventional square cell configuration which for purposes herein may be considered the substantial equivalent of the hexagonal form to be described in more detail. As shown in FIG. 3, the honeycomb is fabricated from a plurality of webs or laminae 12, 12a, 12b, 12c and 12d of sheet material and with adjacent layers adhesively bonded, welded, or otherwise integrally connected together node to node as indicated at 13. In expanded or semi-expanded condition the spaces between the unbonded portions of the webs 12, 12a, etc., define geometric cell openings 15 of a desired configuration and size. In FIG. 3, the cell openings are shown expanded to nominal hexagonal cell size, whereas in other embodiments to be hereinafter described, it will be seen how the honeycomb may be only partially expanded to increase the density of the material and decrease the cell size.

The present invention contemplates that the honeycomb shall be fabricated from substantially any type of metal foil, particularly metal foils such as aluminum, stainless steel, and (using proper precautions against spontaneous combustion) magnesium or lithium in their substantially pure form, or foils made of various metal alloys incorporating aluminum, magnesium, lithium, beryllium, boron or others.

Should the honeycomb core 10 shown in FIGS. 1–3 be manufactured from a material such as aluminum foil, for example, the following aspects are significant for consideration. Firstly, it is desirable to provide a suitable oxidizer, such as plasticized ammonium perchlorate or lithium perchlorate, in appropriate quantities that will unite with and consume the aluminum as a high energy fuel. Indeed, it is desirable to chemically bond or unite the oxidizer with the honeycomb material, and with the catalyst, if any, interspersed between the metal foil and oxidizer layers. More will be said later in reference to the methods of and requirements involved in obtaining an intimate bond between the propellant mass 14 and the metal honeycomb cell walls.

Apart from contributing structural strength and possibly significant combustion heat to the rocket engine, a metal honeycomb such as aluminum, has the capacity to transfer heat at a rapid rate from the immediate burning zone into the interior of the propellant filling the honeycomb cells in advance of the rate of burning of the propellant.

More specifically, FIGS. 19 and 20 illustrate the effect that an aluminum honeycomb or other metal honeycomb with a heat transfer rate substantially higher than the propellant packed in the cells has in transferring heat into the propellant 14 in advance of actual combustion. It is to be expected that the fuel propellant 14 consisting of fuel particles and oxidant which is located closest to the aluminum cell walls will continue to heat and burn at a faster rate than the fuel located more toward the cooler center of each cell and further away from the metal honeycomb. As a consequence, the propellant in each cell will tend to burn away in the form of a convex mound with the peak 16 of each mound being substantially coincident with the center of each honeycomb cell. The forming of the propellant into mounds will substantially increase the burning area and therefore the burning rate of the propellant which, in turn, increases the thrust of the rocket. Depending on the alloy or composition of aluminum or other metal honeycomb used and on the type and amount of oxidizer coating the honeycomb, the latter may burn away and be consumed at a rate either approximately equal to or somewhat behind or even ahead of the burning rate of the fuel 14. FIG. 20 illustrates the walls 17 of aluminum honeycomb burning away at a slightly slower rate than the solid fuel 14 which is immediately adjacent the heated walls.

It is considered to be of critical importance that the solid propellant agents 14 filling each cell be in intimate contact with the surrounding metal walls of the cell. The intimate contact between the propellant and the honeycomb walls is deemed necessary to prevent flame from flashing down the interface between the propellant and honeycomb cell walls. Any substantial amount of flashing of the flame down the cell walls represents uncontrolled and ununiform burning which, at the very least, results in undesired fluctuations of pressure, and which, when extreme, can cause explosion of the rocket.

Several ways of establishing the necessary intimate contact between the propellant agents and the honeycomb cell walls are proposed. The first method may be practiced in instances where the composition of the amorphous propellant mass itself either wets or is self-adherent to the metal surfaces of the honeycomb. For example, when using an ammonium perchlorate-epoxy oxidizer mix, the epoxy compound may be employed to form a very strong adhesive bond between the propellant mass and the honeycomb cell walls. Similarly, other types of fuel oxidant mixes in the form of gels or highly viscous or tar-like compounds, will wet the metal honeycomb surfaces and establish intimate contact therewith.

In instances where the propellant mass is not sufficiently self-adhering or wetting to the honeycomb cell walls, it is necessary to employ a coating of a suitable adhesive at the interfaces between the propellant and the honeycomb cell walls. Such adhesive must be compatible to adhere both to the propellant mass and to the metallic surfaces of the honeycomb cells to act as a flame sealant and prevent flashing of flame down the cell walls.

As above stated, one of the principal objectives of the invention is to utilize burnable metal honeycomb in such a manner as to increase the burning rate of the solid propellant by a very significant factor. To accomplish this end, and as also above explained, it is necessary that the metallic honeycomb conduct heat from the primary burning surface of the grain in advance of the overall rate of flame propagation of the propellant, whereby the heat conducted by the metal honeycomb will pre-heat the propellant mass within each cell so as to cause the latter to burn at a faster rate adjacent the cell walls than along the central axis of the cell, and thereby increase the burning area of the propellant mass which in turn increases the burning rate of the grain. Hence, if it is desired to utilize the metal honeycomb to obtain the fastest burning rate possible for the particular type of propellant used, the adhesive coating used to bond the propellant mass to the cell walls should not act as an insulator or inhibitor against rapid transfer of heat from the metal honeycomb cell walls to the propellant mass adjacent the cell walls. Therefore, in such instances, it is preferable to employ an adhesive substance that will either rapidly conduct heat from the honeycomb to the propellant or that will burn away or otherwise decompose at a temperature substantially below the ignition temperature of the propellant mass itself. In employing polyurethane-ammonium perchlorate fuel-oxidizer mixes and other conventional fuel-oxidizers, for example, we have found that substances such as nitro-cellulose may be employed as a suitable adhesive to bond the propellant mass to the honeycomb cell walls. Nitro-cellulose will burn at temperatures substantially lower than the propellant mass itself and will therefore allow rapid transfer of heat from the metal honeycomb to the propellant in advance of the rate of flame propagation of the primary burning surface of the grain.

In end-burning grains as shown in FIGS. 1 and 2, electrical energization of the squib will ignite the powder charge 7 which in turn will cause a hot igniting flame to fill the lower end of the combustion chamber and cause ignition of the exposed end surfaces of the grain. The pressure developed in the ignition cycle will cause the plug closure 6 of the squib to blow out at a predetermined pressure, for example, 2,000 lbs. sq. in. This will cause an initial high specific impulse or thrust to be generated through the after end of the rocket to overcome inertia and initiate rocket take-off and flight. The burning of the grain will, of course, proceed longitudinally of the rocket from the after end toward the nose end of the combustion chamber until the charge is fully consumed. The honeycomb 11 in FIGS. 1–2 will serve to contain, hold in place, and stabilize the oxidant, fuel or other propellant material 14 which solidly fills the cells of the structural material 11 or 21.

FIGS. 4, 5 and 6 show a modified type of rocket grain utilizing structural honeycomb as a component thereof. This modification provides a center burning type structure in which ignition proceeds from the hollow central core 26 radially outwardly through the rocket grain toward the walls of the rocket case. In the embodiment illustrated in FIGS. 4–6 there is provided two concentric sleeves or annuli of honeycomb as indicated at 27 and 28, respectively, and with the cells of the honeycomb oriented perpendicular to the lengthwise axis of the rocket and radially aligned relative to the circular cross-section of the rocket case. The inner annulus 28 or honeycomb is shown with substantially smaller cell openings than the size of cell openings defining the outer annulus of honeycomb 27. This illustrates how the present invention may be employed to vary either the type of fuel charge used, or how the density of the charge may be varied between different stages of burning and in accordance with desired structural or chemical specifications which the rocket grain is required to meet. In the arrangement shown in FIGS. 4–6, the concentric cylinders or sleeves of honeycomb provide very considerable structural strength to resist pressures developed in the center core 26 of the rocket and which tend to burst the casing. In view of the fact that the highest maximum bursting pressures can be expected to be developed during the ignition and early combustion cycles, it is possible for a designer to use the strength characteristics of the honeycomb during the early stages of burning and design the rocket casing 2 with only sufficiently adequate strength to withstand the lower pressures developed during later stages of flight and at burn-out. In the FIGS. 4–6 embodiment, there is provided a perforate layer of metal or other sheet material 29 to opposite sides of which adjacent contacting surfaces of the honeycomb sleeves 27 and 28 may be rigidly and securely adhesively bonded to establish an integral structure. The perforations in layer 29 are to permit burning of the grains to proceed uninterrupted from inner sleeve 28 to outer sleeve 27. The outer surfaces of honeycomb sleeve 27 are preferably bonded to the interior walls of the rocket casing. The inner circumference of honeycomb sleeve 28 may be initially covered with a layer of igniter or fuse material 32, such as sodium nitrate impregnated paper or cellulose nitrate film or sheet. This covering may be provided to seal the rocket charge from exposure to air during storage of the rocket and before ignition thereof. It is also contemplated that the provision of an igniter or fuse material 32 in intimate contact throughout the inner circumference of the fuel charge will insure the simultaneous and uniform ignition of the charge when the squib is energized at the moment before take-off.

Figure 7:
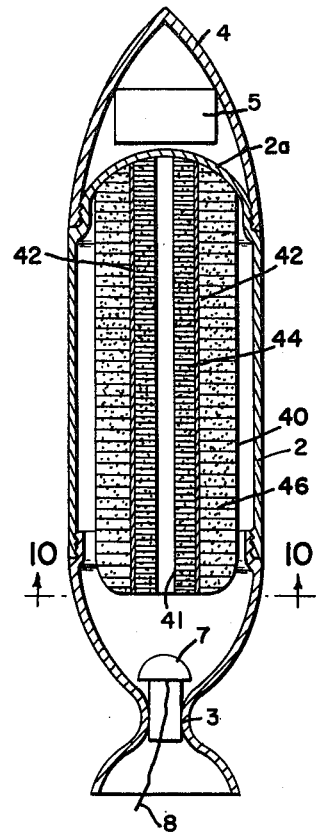
Figure 8:
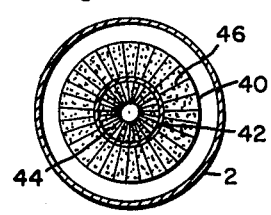

FIGS. 7–8 are similar to the immediately preceding described embodiment of the invention in that the cells of the honeycomb are oriented perpendicular to the center line axis of the rocket case and radially with reference to the circular cross-section of the chamber or casing. The construction shown in FIGS. 7–8 provides a rocket grain that will ignite and burn radially inwardly from an outer surface 40, and radially outwardly from an inner surface 41. More specifically, the grain comprises a rigid internal tube or sleeve support 42 which is welded or otherwise structurally mounted to end plate or shell 2a of the rocket case. An interior annulus of honeycomb 44 is adhesively bonded to the inner circumference of tube support 42, whereas, an outer annulus 46 of honeycomb is securely attached by adhesive or other means to the outer circumference of said support member 42. As previously described, the cells of the honeycomb are solidly filled with propellant agents. As the burning of the grain progresses inwardly from surface 40, the diameter of annulus 46 decreases thereby decreasing the burning area of the grain. However, as the burning from surface 41 progresses outwardly, the diameter of annulus 44 is enlarged and the burning area of the grain in this regard is increased. It is considered within the skill of the art to correlate the relative sizes of the inner and outer honeycomb grains 46 and 44, and the burning rates of the materials from which each is made so as to maintain a substantially constant and uniform burning area of rocket grain throughout substantially the entire flight, whereby uniform thrust or pressures can likewise be maintained.

Figure 9:
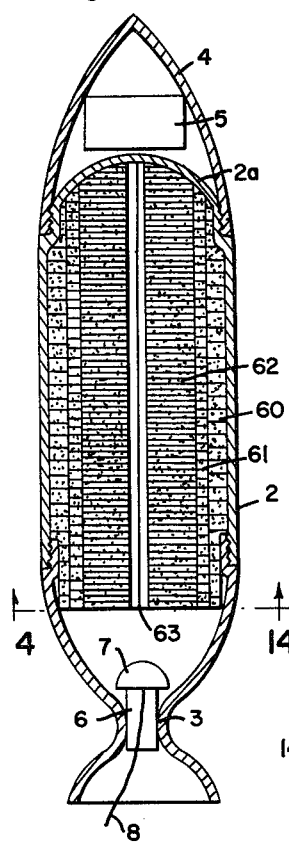
Figure 10:
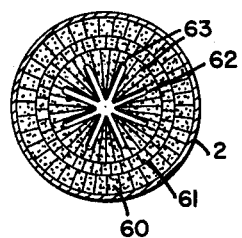

FIGS. 9 and 10 illustrate another form of rocket employing concentric annuli or plural layers of honeycomb such as designated at 60, 61 and 62, respectively. It will be appreciated that the outer ring 60 may be bonded to the inside of the casing tube whereas each of the inner rings 61 and 62 may likewise be structurally connected to one another and to the inner circumference of the outer ring 60. The center honeycomb core 62 is also shown as being formed with a star-shaped longitudinal igniting passage 63 to provide an enlarged igniting and initial burning area of the grain. As in the case of previously described embodiments, the honeycomb cells of each of the three rings 60, 61 and 62, are filled with an oxidant or other solid propellant compound. By varying the cell sizes of the three honeycomb layers and/or by varying the type of material from which the honeycomb is manufactured, or the solid fuel composition which fills the honeycomb cells, it is of course possible to regulate and vary the rate of burning, and therefore the thrust developed by the engine during various stages of flight. Thus, for example, in FIGS. 9 and 10, it might probably be desirable to manufacture the inner honeycomb grain 62 from materials that will provide a rapid burning rate that will develop a high thrust during rocket take-off. The second or intermediate grain component 61 might be manufactured from a different size and/or type of honeycomb and related oxidant filler so as to provide a somewhat slower burning grain calculated to provide maximum thrust efficiency during the early or middle stages of rocket flight. The outer layer 60 may likewise be made of still a different type and/or cell size of honeycomb reinforced grain that will provide a third and different type of burning computed to produce optimum flight performance during the terminal stages of rocket flight.

FIGS. 11-18, inclusive, illustrate a rocket construction in which the grain 10 includes a main body or section of honeycomb 70 and a nose section of honeycomb 71. The cells of the honeycomb section 71 are disposed radially with reference to the arc defining the head plate 2a of the rocket case. The honeycomb section 70 is formed with a star-shaped igniting passage 72 and which defines the surfaces of the grain that will initially be ignited upon actuation of the squib. FIGS. 13-18, inclusive, illustrate the manner in which the grain 10 will be progressively burned away and consumed from the moment following ignition to the moment of burn-out.

It may be observed with reference to substantially all of the above described embodiments of the invention that the solid oxidant and/or fuel material 14, although not itself a structural material, nevertheless contributes to the strength of the honeycomb reinforced grain because it seals the honeycomb cells and prevents leakage of gases from the combustion area into the interior of the rocket grain or into the periphery of the rocket casing. The seal between oxidants and the honeycomb is an important factor in preventing the formation of fissures or fractures in the material that can cause uneven burning or even explosion of the rocket as hereinabove set forth.

The presence of solid propellant agents in the cells also prevent deformation by way of collapse or elongation of the honeycomb material under influence of forces applied in tensile, compression, or shear during handling or flight of the rocket.

As earlier indicated it is also possible to take advantage of the fact that the cellular nature honeycomb presents a large surface area, which if fabricated as a propellant, can be used to provide greatly enlarged structurally reinforced burning areas. Thus, FIGS. 22 and 23 show a honeycomb type grain in which the cell openings are not filled or completely closed, with propellant agents as hereinabove proposed with reference to the preceding described embodiments. More specifically, FIGS. 22 and 23 illustrate a consumable honeycomb reinforcing structure 80 formed, for example, of aluminum, or aluminum lithium alloy, and which is embedded within a coating or body 81 of a fuel-oxidant mixture such as synthetic rubber and oxidant mixture or other material having sufficient adhesive strength to bond itself and retain its shape as a coating on the honeycomb support. The unfilled cell openings or passage 83 of the honeycomb grain leave exposed large potential burning surfaces. An open cell type grain as herein described may, of course, be used to construct the entire, or only a portion of a given rocket charge. In particular, however, it is contemplated that such type of construction might be used as the ignition and initial combustion surface of an otherwise solid reinforced grain 85, and as a device to provide an enlarged ignition and initial burning area.

It is observed in reference to all embodiments of the invention shown in the drawings and to which reference has hereinabove been made, that the honeycomb fuel component is oriented in reference to the combustion chamber of the rocket whereby primary burning of the grain occurs in a direction parallel to the axes of the honeycomb cells. Even though we have shown examples of both end burning, as well as center burning rockets, in each instance, the primary flame propagates itself in the direction of the axes of the honeycomb cells. Thus, in the end burning rocket construction illustrated in FIGS. 1 and 2, the axes of the honeycomb are disposed longitudinally of the rocket, and burning within the combustion chamber also occurs longitudinally of the rocket—i.e., parallel to the cell axes. In the center burning rockets as shown in FIGS. 4-17, inclusive, the honeycomb is oriented with its cell axes disposed radially in reference to the longitudinal axes of the rocket chamber, and this is the direction in which the primary burning of the grain occurs.

FIG. 24, however, discloses a center burning rocket grain in which the primary burning will proceed radially from the center opening and in a direction crosswise to the axes of the honeycomb cells. A center burning rocket having honeycomb cells oriented in reference to the direction of primary burning similar to that disclosed in FIG. 24 is shown in copending application, Serial No. 804,847, now Patent No. 3,130,672 entitled, Rocket Grain and Method of Constructing Same, filed in the name of Wells A. Webb.

As earlier mentioned, test results indicate that burning of an aluminum honeycomb reinforced propellant in the direction of the cell axes increase the burning rate of the propellant approximately 3-fold more or less; whereas, burning of the propellant crosswise of the cells will increase the burning rate of the propellant approximately 2-fold more or less; thus, whether a given rocket grain embodying the present invention is designed for down-cell or cross-cell burning will in some measure depend upon the effective burning rate that is desired to be obtained from the propellant. The particular orientation of the honeycomb will, of course, also depend upon other considerations such as the required strength characteristics that the honeycomb is designed to provide—it being well known that honeycomb has greater strength and rigidity in the direction of its cell axes than in a direction perpendicular to its cell axes.

In further reference to the structural reinforcing advantages obtainable in employing combustible metal honeycomb reinforced grains according to the present invention, reference is again made to more conventional or prior art practices in the art. More specifically, in designing and manufacturing high acceleration rockets of the solid propellant type it has been recognized that high inertial stresses which are imposed on the rocket grain require some type of mechanical or structural reinforcement for the grain.

Accordingly, it has been more or less conventional in the art to reinforce grains with a plurality of metal wires or rods which are extended through the body of the grain. The metal rods or wires also conduct heat into the body of the grain at a faster rate than flame propagation proceeds from the surface. The burning of the grain adjacent the rods or wires will be in the shape of inverted cones surrounding each wire or rod, leaving islands of unreinforced propellant in the spaces between the rods or wires that burn at a substantially slower rate than the areas of propellant which are adjacent and surround the metal rods or wire. The relatively large isolated areas of propellant which are not reinforced by any wires or rod structures often have a tendency to break off in chunks or slivers and as unburned fuel be expelled from the exhaust of the rocket engine. This latter situation is obviously undesirable and wasteful.

The metal honeycomb fuel component which is utilized in the present invention not only structurally reinforces the grain in the manner heretofore explained, but, in addition, the cellular honeycomb actually divides and encapsulates the entire grain into very small localized propellant units as defined by and contained within the surrounding metal walls of the honeycomb cells. Thus, when the grain burns more rapidly down the interfaces between the grain and the metal honey comb the dome-shaped center part of each propellant unit contained within each cell is, at its base, firmly retained by, and is securely attached to, the surrounding sides of the honeycomb cells walls thus preventing any likelihood of the propellant grain from prematurely breaking away and being exhausted in the form of unburned slivers or chunks as is often the case in more conventional solid propellant grains reinforced only by metal wires or rods.

Another advantages of encapsulating the propellants into structurally distinct increments of perhaps ⅛" to ¼" (more or less) cross-section is that it is possible to utilize relatively high energy propellants that have very little cohesive strength and which would make their use impossible in more conventional solid propellant grain systems alluded to earlier. Macro-encapsulation permits the use of propellants which can be in a gel form. Thus, the term "solid propellant" as used herein and in the claims means a propellant which is (1) relatively non-compressible and (2) which is sufficiently viscous or gelatinous to hold itself in shape within the honeycomb cells without spilling or sloshing out due to turbulence created by the flame at the burning surface of the grain. Successful tests have been made utilizing propellants having a consistency about the same as conventional food gelatins, the said propellants having been encapsulated in metal honeycomb cells of ⅛" to ¼" cross-section.

Another advantage of macro-encapsulation of the propellant as provided by the honeycomb cells is that it is feasible to fill certain cells with a fuel propellant, and to fill adjacent or surrounding cells with a normally reactant oxidizer. It is apparent that without encapsulating or separating such materials, they could not be intermixed and used in a single solid grain structure.

An example of a rocket motor embodying the concepts of the present invention and which said motor was successfully test-fired is hereinbelow given. A 7 x 7 inch rocket motor was fabricated utilizing aluminum honeycomb of 0.7 mil gauge and 3/16 inch diameter cell openings. The honeycomb itself was made substantially 7 inches outside diameter and 5½ inches long, and said honeycomb structure was snugly fitted into a plastic rocket motor casing of substantially 7 inches inside diameter and 7 inches long. Thereupon the honeycomb cells were filled with nitroplastisol propellant which self-adhered to the metal walls of the honeycomb and did not require any separate adhesive agent to bond the propellant to the cell walls at the interfaces between the two. A nitroplastisol was compressed into the honeycomb cell structure in its uncured and viscous condition and cured at 120° F. until the same assumed a relatively solid and unyielding texture. The nitroplastisol maintained itself intimately adhered to the surrounding walls of the honeycomb in which the nitroplastisol was encapsulated.

The nitroplastisol also formed an intimate bond with the head plate of the rocket motor. A rocket exhaust nozzle having a minimum throat diameter of 1.237 inches was securely fitted to the open end of the motor casing and the nitroplastisol honeycomb grain was ignited by a pyrotechnic material inserted in the space between the initial end burning surface of the grain and the exhaust nozzle. Certain specific measurements and results made in reference to the foregoing test rocket motor and firing thereof are set forth in the following statistical table:

1. Total propellant weight* (measured weight of grain including the aluminum honey comb component and the amorphous mass of nitroplastisol propellant), lbs. _____ 13.829
2. Total propellant weight expended, lbs. _____ 13.735
3. Equilibrium time (period of time during which the grain was burning at a substantially constant and near peak burning rate and pressure), sec. _____ 2.005
4. Tail-off time (period of time that grain took to burn completely out and drop to zero pressure following the equilibrium burning period), sec. _____ 0.455
5. Total time (ignition time, plus equilibrium time, plus tail-off time), sec. _____ 2.660
6. Characteristic exhaust velocity (measured during equilibrium burning time), ft./sec. _____ 4933.4
7. Average combustion chamber pressure (measured during equilibrium burning time), lbs./in.² _____ 821.79
8. Effective time (period of time during which significant or useful thrust was being produced by the motor and which includes a latter part of the ignition time and the beginning part of the tail-off time), sec. _____ 2.148
9. Effective burning rate (measured during equilibrium burning time), in./sec. _____ 2.676
10. Grain temperature (body temperature of the grain at time of ignition), ° F. _____ 70

*(Of the total propellant weight, the aluminum honeycomb component weighed 0.484 lb. or 3.6% of the total weight. The nitroplastisol component was of conventional formulation and consisted of the primary ingredients of tri-ethylene glycol di-nitrate and nitro-cellulose, forming a matrix in which was interspersed ammonium perchlorate powder and small amounts of aluminum powder.)

It is also pointed out that nitroplastisol in standard strand burning tests (without presence of honeycomb) burns at the rate of about .8 in./sec. at a pressure of 821.79 lb./in.². The above test results indicate therefore that when nitroplastisol is reinforced by an aluminum honeycomb fuel component, the burning rate of the nitroplastisol is increased from .8 to 2.676 in./sec., or about 3.3 times, measured in the direction of down-cell burning.

As has been previously indicated herein, it is considered within the broader scope of the present invention to make honeycomb material out of substantially any combustible metal foil which has structural strength and which will burn in the presence of oxygen to provide a high energy fuel reinforcement for the entire rocket grain. Honeycomb today is made commercially from a variety of sheet materials, including aluminum and stainless steel. For general instruction in the art of making honeycomb, reference is made to prior Patents Nos. 2,610,934, dated September 16, 1952, and 2,734,843, dated February 14, 1956. It is also noted that it has been proposed to make honeycomb of various types by adhesively bonding, welding, mechanically fastening, or stitching the adjacent nodes of the honeycomb ribbons together. The actual manufacture or fabrication of the honeycomb to be employed in any particular rocket grain is not, per se, considered as a part of the present invention. Furthermore, the particular way in which the honeycomb cells might be filled or packed with the oxidant or other propellant 14 is likewise considered to involve considerations within the skill of the art and which may vary according to the type of oxidant or filler to be employed. It is contemplated that in certain applications, the honeycomb cells might be filled with the solid propellant before the honeycomb is inserted inside the rocket casing 2. In other applications, it may be desired to first insert the honeycomb material and thereafter fill the cells with the propellant agents by any suitable or expedient process.

Although the present invention has been described in some detail by way of illustration and example for purposes of clarity of understanding, it is understood that certain changes and modifications might be practiced within the spirit of the invention as limited only by the scope of the claims appended hereto.

What is claimed:

1. In combination with a combustion chamber of a rocket, a high impulse solid propellant grain comprising a multi-cellular honeycomb fuel component formed of relatively thin mil gauge combustible metal foil having both substantially greater structural strength than, and a substantially higher rate of heat conductivity than, the amorphous mass of propellant agent hereinafter specified; said honeycomb fuel component defining a plurality of substantially unidirectionally extending geometric cell openings; a substantially solid amorphous mass of fuel and oxidant propellant agent filling said cell openings; said propellant mass in each cell opening being in sufficiently intimate contact with the surrounding walls of said cell to prevent flame propagation down the interface between the propellant and cell walls; said propellant mass including oxidizer sufficient to react with both the fuel contained in the mass and the combustible metal foil honeycomb fuel component.

2. The combination of claim 1 and wherein the propellant mass is intimately bonded to the cell walls by a coating of heat destructible adhesive compatible to adhere both to the propellant mass and to the metallic surfaces of the honeycomb cells; and wherein further the temperature point at which said adhesive coating is destroyed is substantially lower than the ignition temperature of said propellant mass, whereby heat conducted by said metal honeycomb in advance of the burning rate of said propellant mass will destroy said adhesive coating in advance of burning of said propellant and cause the propellant within each cell to burn at a faster rate adjacent the cell walls than along the central axis of the cell.

3. The combination of claim 1 and wherein the cell axes of said honeycomb structure extend parallel to the longitudinal axis of the combustion chamber to provide an end burning rocket motor.

4. The combination of claim 1 and wherein said honeycomb fuel component is fabricated in the form of at least one annulus defining a central bore disposed parallel to the longitudinal axis of the combustion chamber, and with the axes of the honeycomb cells disposed radially in reference to said longitudinal chamber axis, whereby there is provided a center burning rocket motor.

5. The combination of claim 4 and wherein said honeycomb fuel component includes first and second honeycomb annuli of different diameters concentrically positioned relative to one another.

6. The combination of claim 5 and wherein the respective densities and burning characteristics of said two honeycomb annuli differ from one another.

7. The combination of claim 5 and wherein the outside diameter of the smaller of the two honeycomb annuli is substantially less than the inside diameter of the larger of the two to define an annular passage between the two concentrically positioned honeycomb annuli in which both inward and outward simultaneous radial burning of the grain can occur.

8. In the art of rocket engines the combination comprising a cylindrical casing including a combustion chamber having its after end terminating in a constricted exhaust nozzle; a structural grain substantially filling said chamber; said structural grain including at least two concentric annular sections of burnable metallic cellular honeycomb defining cell openings solidly packed with an amorphous mass of propellant agents and with the axes of said cells disposed perpendicular to the axis of said chamber and exhaust nozzle extending from communication with the exhaust end of said chamber into the interior of said grain defining a center burning type grain.

9. The combination of claim 8 and wherein the respective densities and burning characteristics of said two honeycomb sections differ.

10. The combination of claim 8 and wherein the outer annular section of honeycomb is bonded to the interior walls of the combustion chamber and wherein the inner annular section is integrally structurally connected to said outer section; said inner section of honeycomb formed with a central bore defining said open passage.

11. In the art of rocket engines and in combination with a cylindrical combustion chamber terminating at its after end in a constricted exhaust nozzle; an annular structurally reinforced grain including a burnable metal structural honeycomb fuel component substantially filling said combustion chamber; means supporting said annular grain coaxially within said chamber and with the outer circumference of the grain spaced from the interior walls of the combustion chamber defining an annular open passage in communication with the after end of said chamber; the inner circumference of said annular grain defining an open passage communicating with the after end of said chamber; said grain including an oxidant carried in the cell openings of the honeycomb operable to simultaneously burn from its outer circumference inwardly and from its inward circumference outwardly.

12. In the art of rocket engines and in combination with a cylindrical casing defining a combustion chamber closed at its forward end with a headplate and terminating at its after end in a constricted exhaust nozzle; a grain-supporting sleeve rigidly supported at one end to the headplate and extending axially interiorly of the combustion chamber substantially the entire length thereof; a first structurally reinforced annular grain including a burnable metal structural honeycomb fuel component rigidly mounted on the outer circumference of said sleeve with the outer circumference of the grain spaced from the interior walls of the chamber defining an annular open passage communicating with the after end of the chamber; a second structurally reinforced annular grain including a burnable metal structural honeycomb fuel component rigidly mounted to the interior circumference of said sleeve and with the inner circumference of said second grain defining an open passage communicating with the after end of said chamber, said first and second grains each including an oxidant carried in the cell openings of the honeycomb.

13. The combination of claim 1 and wherein the said axes of said honeycomb fuel component are oriented relative to said combustion chamber to provide primary burning of the grain in the direction of said cell axes and to provide a burning rate for the grain at least 3 times the normal burning rate of the amorphous mass of propellant agent.

14. The combination of claim 1 and wherein the cell axes of said honeycomb fuel component are oriented relative to said combustion chamber to provide primary burning of the grain in a direction perpendicular to the cell axes and to provide a burning rate for the grain at least 2 times the normal burning of the amorphous mass of propellant agent.

References Cited by the Examiner

UNITED STATES PATENTS

| 2,977,885 | 4/1961 | Perry et al. | 102—98 |
| 3,032,970 | 5/1962 | Fox | 60—35.6 |

MARK NEWMAN, *Primary Examiner.*

SAMUEL FEINBERG, SAMUEL LEVINE, *Examiners.*